US005828196A

United States Patent [19]

Hetzmannseder

[11] Patent Number: 5,828,196

[45] Date of Patent: Oct. 27, 1998

[54] APPARATUS AND METHOD FOR CONTROLLING AN ELECTRIC MOTOR

[75] Inventor: Engelbert Hetzmannseder, Milwaukee, Wis.

[73] Assignee: Eaton Corporation, Cleveland, Ohio

[21] Appl. No.: 917,054

[22] Filed: Aug. 22, 1997

[51] Int. Cl.[6] .................................................... H02K 17/32

[52] U.S. Cl. .......................... 318/434; 318/432; 318/433; 318/445; 318/474

[58] Field of Search .................................... 318/432, 433, 318/434, 445, 474

[56] References Cited

U.S. PATENT DOCUMENTS 3,959,753 5/1976 Wafer .
4,991,050 2/1991 Heberlien et al. .
5,463,294 10/1995 Valdivia et al. ........................ 318/432

*Primary Examiner*—Karen Masih
*Attorney, Agent, or Firm*—Tarolli, Sundheim, Covell, Tummino & Szabo

[57] ABSTRACT

A bypass circuit conducts electrical current around a motor starter to a current limiting switch assembly upon initiation of a flow of excessive electrical current to an electric motor to protect the motor starter against excessive current flow. Upon initiation of excessive current flow to the electric motor, the current limiting switch assembly opens a main circuit to interrupt current flow through the motor starter. The current limiting switch assembly includes a conductor or contact carrier which is movable from an initial position to an actuated position under the combined influence of current flow through a coil and opposition between magnetic fields from portions of an electrical circuit through which current flows in opposite directions.

23 Claims, 4 Drawing Sheets

APPARATUS AND METHOD FOR CONTROLLING AN ELECTRIC MOTOR

BACKGROUND OF THE INVENTION

The present invention provides a new improved apparatus and method to protect a motor starter against the effect of excessive current flow upon malfunctioning of an electric motor.

A known apparatus for use in controlling an electric motor includes a motor starter. The motor starter may include a contactor and an overload relay. The overload relay provides thermal protection for the motor. Motor starters are expensive. Upon the occurrence of a malfunction of an electric motor, excessive current flow through the motor starter may cause welding of contactor contacts and melting or thermal warping of temperature sensitive elements. Known devices for use in controlling an electric motor are disclosed in U.S. Pat. Nos. 3,959,753 and 4,991,050.

SUMMARY OF THE INVENTION

The present invention provides a new and improved apparatus and method for use in controlling an electric motor. The apparatus includes a main circuit which conducts electrical current to the electric motor during normal operation of the electric motor. The main circuit includes a motor starter and a current limiting switch assembly. A bypass circuit is provided to conduct electrical current around the motor starter upon initiation of a flow of excessive electrical current to the electric motor.

When the current limiting switch assembly is in an initial condition, the bypass circuit is open and electrical current is conducted through the motor starter and current limiting switch assembly to the electric motor. When the current limiting switch assembly is in an actuated condition, the current limiting switch assembly is effective to open the main circuit to interrupt the flow of electrical current through the motor starter. At this time, the current limiting switch assembly closes the bypass circuit to conduct the excess flow of electrical current around the motor starter.

The current limiting switch assembly may include a movable conductor on which contacts are disposed. The movable conductor is moved relative to stationary contacts by the effect of magnetic field repulsion or movement of an armature by a coil, or by both of these effects. This minimizes the response time required for the current limiting switch assembly to operate from the initial condition to an actuated condition to protect the motor starter in the event of initiation of excessive current flow to the motor.

BRIEF DESCRIPTION OF THE DRAWINGS

The foregoing and other features of the present invention will become more apparent upon a consideration of the following description taken in connection with the accompanying drawings, wherein.

DESCRIPTION OF ONE SPECIFIC PREFERRED EMBODIMENT OF THE INVENTION

General Description

Figure 1:
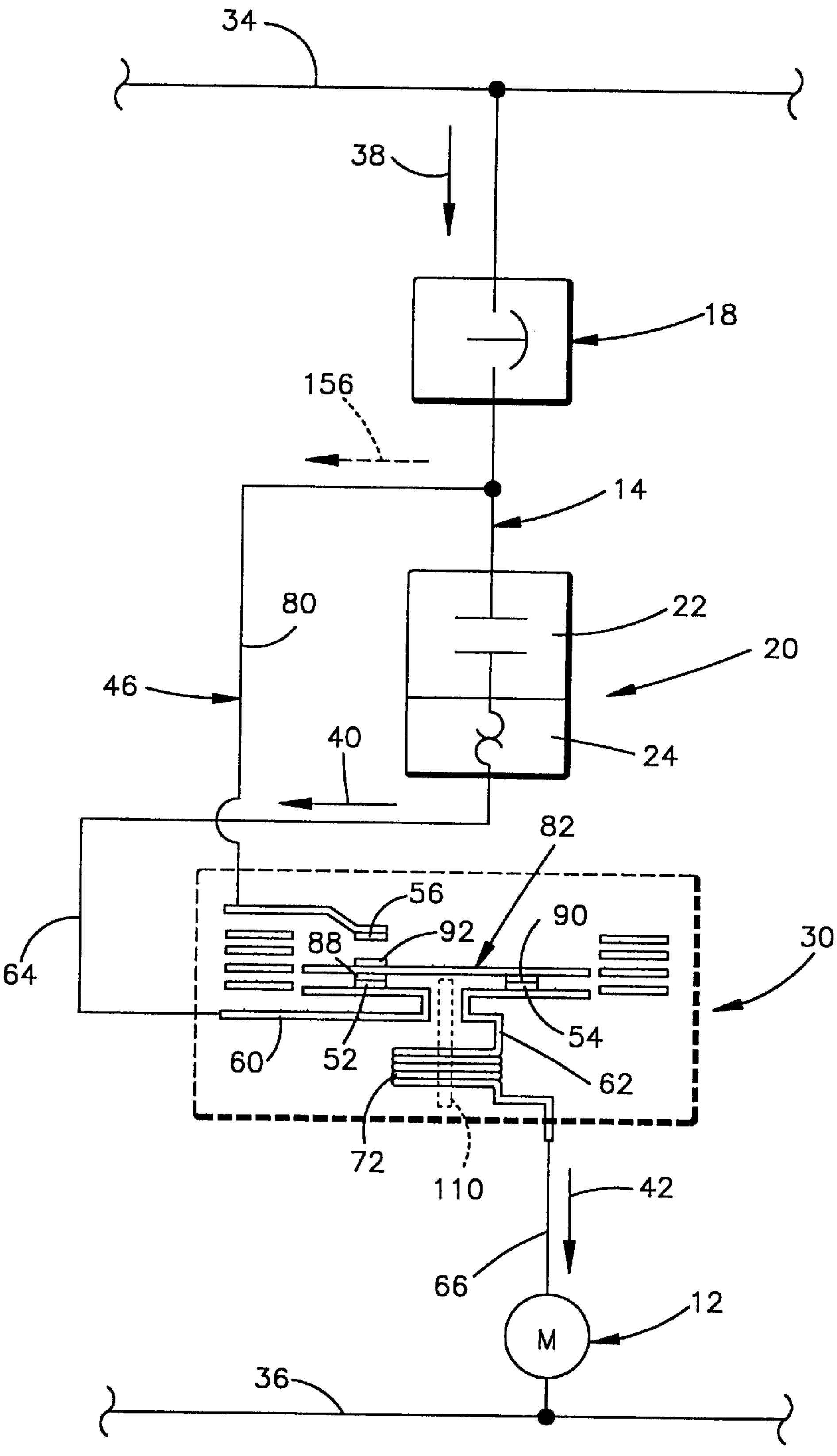
FIG. 1 is a simplified schematic illustration of an apparatus which is constructed in accordance with the present invention and is used to control an electric motor.

An apparatus 10 for use in controlling an electric motor 12 is illustrated schematically in FIG. 1. The apparatus 10 includes a main circuit 14 which conducts electrical current to the motor 12 during normal operation of the motor. The main circuit 14 includes a known motor circuit protector or circuit breaker 18. The motor circuit protector 18 is magnetically tripped by severe fault currents through the main circuit 14. When the motor circuit protector 18 is tripped, it is latched in an open condition in which the main circuit 14 is interrupted.

The main circuit 14 also includes a known motor starter 20. The motor starter 20 includes a contactor 22 which is operated from an open condition to a closed condition to initiate operation of the motor 12. In addition, the motor starter 20 includes an overload relay 24 having a thermal element. The thermal element in the overload relay 24 heats up, as a function of current flow through the relay, and causes the relay to trip open to interrupt electrical current through the main circuit 14 to the motor 12 in the event of abnormal current flow. Although a motor starter 20 having one specific known construction has been illustrated in FIG. 1, it should be understood that the motor starter 20 could have a construction which is different from the illustrated construction.

In accordance with a feature of the present invention, a current limiting switch assembly 30 is disposed in the main circuit 14. The current limiting switch assembly 30 responds quickly to an excessive flow of electrical current to the motor 12 to protect the motor starter 20. The current limiting switch assembly 30 protects the motor starter 20 by interrupting current flow through the motor starter before the motor circuit protector 18 has had time to interrupt current flow through the motor starter.

Upon a serious malfunctioning of the electric motor 12, an excessive current flow may be caused by a shorting out of components of the motor. Only a very small initial portion of the excessive current flow is conducted through the motor starter 20. This is because the current limiting switch assembly 30 immediately opens the main circuit 14 and interrupts the flow of current through the motor starter 20.

The current limiting switch assembly 30 responds to initiation of an excessive current flow substantially faster than the motor circuit protector 18. The time required for response of the motor circuit protector 18 to excessive current flow could allow the excessive current flow to be established through the motor starter 20 for a sufficient length of time to seriously damage the motor starter. However, the current limiting switch assembly 30 quickly responds to the initiation of excessive current flow in the main circuit 14 to interrupt the excessive current flow through the motor starter 20 before the motor starter is damaged.

During normal operation of the electric motor 12, alternating current is conducted from power lines 34 and 36 to the electric motor 12 through the motor starter 20 and the main circuit 14. The power lines 34 and 36 are connected with a source of alternating current potential which may have a voltage of approximately 277 volts. Of course, other AC voltages or even DC voltage could be utilized if desired. Although the power lines 34 and 36 are connected with a source of alternating current, for purposes of simplicity of description, current flow is assumed herein as being in the direction indicated by arrows 38, 40, and 42 in FIG. 1.

In accordance with another feature of the invention, a bypass circuit 46 is provided through the current limiting switch assembly 30, to conduct electrical current around the motor starter 20 upon initiation of a flow of excessive current to the motor 12. By conducting the excessive electrical current around the motor starter 20, the bypass circuit 46 protects the motor starter 20 against damage by the excessive flow of electrical current to the motor 12.

Upon initiation of a flow of either high or low levels of excessive current to the motor 12 through the main circuit 14, the current limiting switch assembly 30 is quickly operated. Operation of the current limiting switch assembly 30 immediately opens the main circuit 14 to interrupt the flow of electrical current through the motor starter 20. In addition, operation of the current limiting switch assembly 30 results in the excessive electrical current being conducted around the motor starter 20 through the bypass circuit 46.

The bypass circuit 46 connects the motor 12 with the power line 34 through the motor circuit protector 18 and through the actuated current limiting switch assembly 30. After the current limiting switch assembly 30 has been actuated, the motor circuit protector 18 operates to interrupt the flow of current between the power lines 34 and 36. Opening of the motor circuit protector 18 interrupts the flow of current through the bypass circuit 46. The current limiting switch assembly 30 then returns to its initial or unactuated condition.

Current Limiting Switch Assembly

The current limiting switch assembly 30 (FIG. 2) includes a housing 50 formed of an electrically insulating material. In one specific embodiment of current limiting switch assembly 30, the housing 50 was formed of glass filled polyester. Although the housing 50 has only been indicated schematically in FIG. 2, it should be understood that the housing is a solid rigid block of material. The housing 50 encloses switch contacts and other components of the current limiting switch assembly 30.

Figure 2:
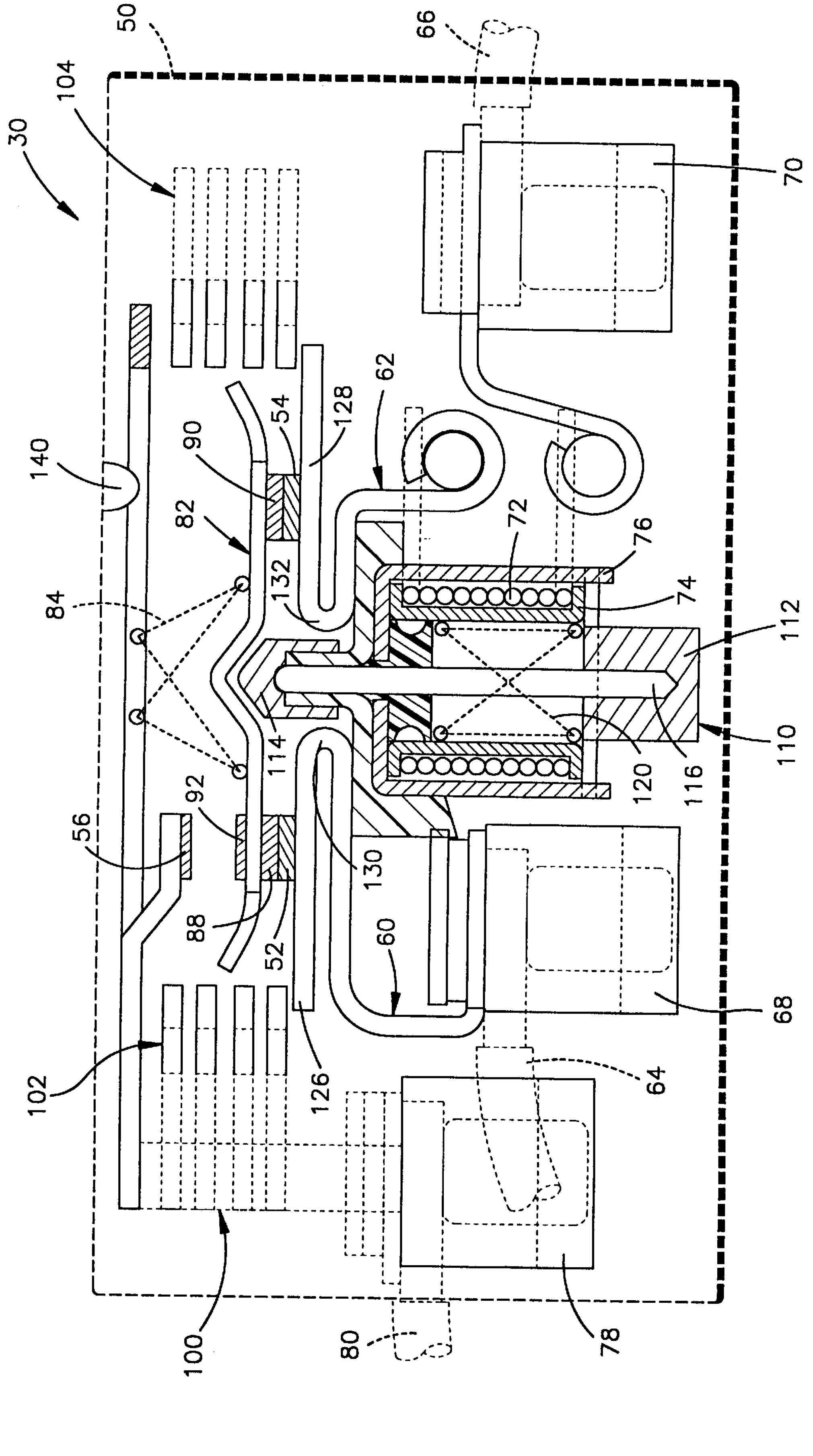
FIG. 2 is an enlarged simplified schematic illustration of a current limiting switch assembly which is utilized in the apparatus of FIG. 1, the current limiting switch assembly being illustrated in an initial or unactuated condition.

The current limiting switch assembly 30 includes a plurality of stationary contacts which are fixedly connected with the housing 50. Thus, the current limiting switch assembly 30 includes a pair of stationary main circuit contacts 52 and 54 (FIG. 2). In addition to the main stationary contacts 52 and 54, the current limiting switch assembly 30 includes a stationary bypass circuit contact 56. The stationary main circuit contacts 52 and 54 form a portion of the main circuit 14 while the stationary bypass circuit contact 56 forms a portion of the bypass circuit 46.

Stationary conductors 60 and 62 connect the stationary main circuit contacts 52 and 54 with main circuit leads 64 and 66. The main circuit lead 64 is connected with the stationary conductor 60 at a terminal lug 68. The main circuit lead 66 is connected with a terminal lug 70.

The stationary conductor 62 and stationary main circuit contact 54 are connected with the terminal lug 70 and main circuit lead 66 through a wound coil 72. The coil 72 is wound around a bobbin 74 formed of an electrically insulating material. The coil 72 is enclosed by a metal frame 76 which is fixedly connected with the housing 50.

The stationary bypass circuit contact 56 is connected with a terminal lug 78. A bypass circuit lead 80 is connected with the terminal lug 78.

A movable conductor or contact carrier 82 is biased toward the initial position shown in FIG. 2 by a spiral coil spring 84. The spiral coil spring 84 has been illustrated schematically in FIG. 2 and is disposed between a surface of the housing 50 and the movable conductor 82.

A pair of movable main circuit contacts 88 and 90 are disposed on the movable conductor or contact carrier 82. A movable bypass circuit contact 92 is disposed on a side of the movable conductor 82 opposite from the movable main circuit contacts 88 and 90.

Electrically isolated splitter plates 100 are mounted in the electrically insulating material of the housing 50 adjacent to the movable conductor 82. The splitter plates 100 minimize arcing between the stationary main circuit contacts 52 and 54 and the movable main circuit contacts 88 and 90 during operation of the current limiting switch assembly 30. The splitter plates 100 are not electrically connected with components of either the main circuit 14 or bypass circuit 46.

The splitter plates 100 include a first or left series 102 of parallel splitter plates and a second or right series 104 of parallel splitter plates. The left series 102 of splitter plates is disposed adjacent to the left (as viewed in FIG. 2) end of the movable conductor 82. The right series 104 of splitter plates is disposed adjacent to the right end of the movable conductor 82.

Figure 5:
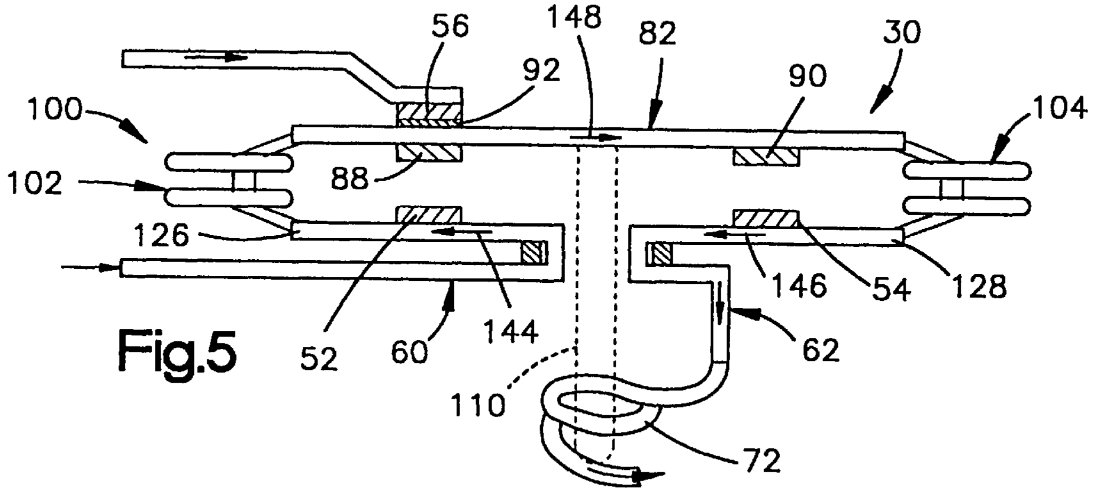
FIG. 5 is a schematic illustration, generally similar to FIG. 4, depicting the contacts in the current limiting switch assembly when the current limiting switch assembly is in an actuated condition.

Upon initiation of excessive current flow to the motor 12, the movable conductor or contact carrier 82 is rapidly moved from the initial or closed position of FIG. 2 to any one of a plurality of actuated positions (FIG. 5). When the movable conductor 82 is in an actuated position, the movable main contacts 88 and 90 are spaced from the stationary main contacts 52 and 54. At this time, the movable bypass contact 92 is in engagement with the stationary bypass contact 52.

Figure 3:
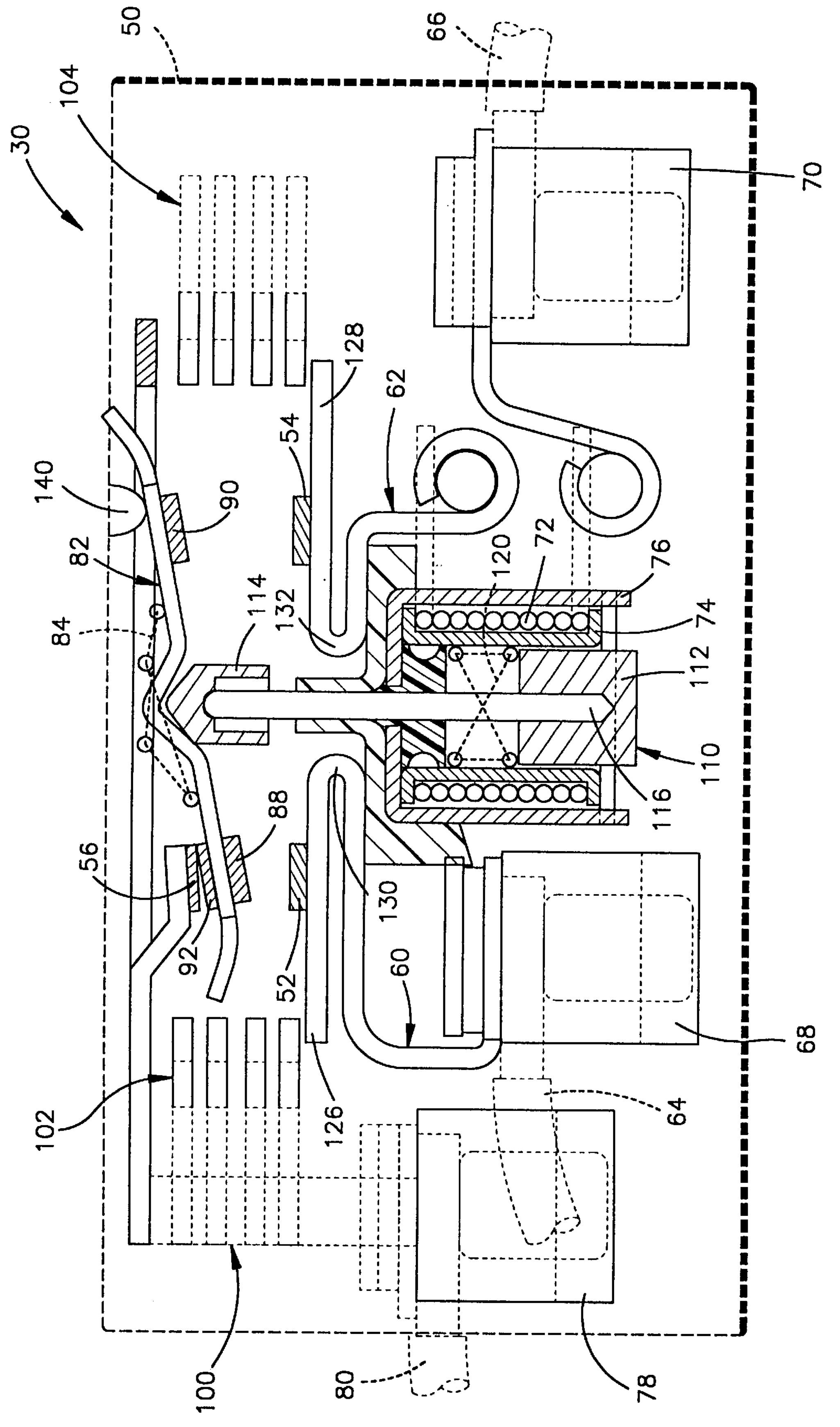
FIG. 3 is a simplified schematic illustration, generally similar to FIG. 2, of the current limiting switch assembly in a fully open condition.

The movable conductor 82 is movable through a plurality of actuated positions to the fully open position of FIG. 3 by the combined influence of the coil 72 and opposition between magnetic fields. To quickly initiate movement of the movable conductor 82 away from the initial position shown in FIG. 2, a plunger 110 is moved upward (as viewed in FIG. 2) under the influence of the magnetic field emanating from the coil 72. The plunger 110 applies force against the movable conductor 82 to initiate upward movement of the movable conductor.

The plunger 110 includes a cylindrical armature 112 formed of a magnetizable metal (steel). The armature 112 is connected with a generally cylindrical head end 114 of the plunger 110 by a cylindrical rod 116. The head end 114 is formed of a nonmagnetizable material, specifically glass filled nylon. When the movable conductor 82 is in the closed or initial position shown in FIG. 2, the head end 114 of the plunger 110 is pressed against the housing 50 by a helical coil spring 120.

The stationary conductor 60 has a leg 126 which extends parallel to the movable conductor 82 when the movable conductor is in the initial position shown in FIG. 2. Similarly, the stationary conductor 62 has a leg 128 which extends parallel to the movable conductor 82 when the movable conductor is in the initial position of FIG. 2. The stationary main circuit contacts 52 and 54 are disposed on the legs 126 and 128 of the stationary conductors. The ends of the legs 126 and 128 of the stationary conductors 60 and 62 are disposed adjacent to and spaced a slight distance from the left and right series 102 and 104 of splitter plates 100.

The current limiting switch assembly 30 is operable between the initial or closed condition of FIG. 2 and the fully open condition of FIG. 3. When the current limiting switch assembly 30 is in the initial condition (FIG. 2), the movable conductor 82 forms a portion of the main circuit 14 through which current is conducted to the motor 12 (FIG. 1). At this time, the bypass circuit 46 is open. When the current limiting switch assembly 30 is in the fully open condition of FIG. 3, the main circuit 14 is open to interrupt the flow of electrical current through the motor starter 20 to the motor 12.

When the current limiting switch assembly 30 is in the initial condition (FIG. 2), the movable main circuit contacts 88 and 90 on the movable conductor 82 are disposed in engagement with the stationary main circuit contacts 52 and 54. Assuming the direction of current flow indicated schematically by the arrows 38, 40 and 42 in FIG. 1, electrical current is conducted from the main circuit lead 64 through the stationary conductor 60 to the stationary main circuit contact 52. This electrical current is conducted from the movable main circuit contact 88 through the movable conductor 82 to the movable main circuit contact 90. The electrical current flows from the movable main circuit contact 90 through the stationary main circuit contact 54 and stationary conductor 62 to the coil 72. The current is conducted from the coil 72 to the main circuit lead 66 connected with the motor 12 (FIG. 1).

At this time, the motor 12 is drawing a normal operating current. The normal operating current for the motor 12 is insufficient to cause the magnetic field from the coil 72 (FIG. 2) to attract the armature 112 with sufficient force to overcome the effect of the biasing spring 120. Therefore, the plunger 110 remains in the retracted or initial position illustrated in FIG. 2.

When the current limiting switch assembly 30 is in the closed condition of FIG. 2, the direction of flow of current through the movable conductor 82 is opposite to the direction of flow of current through the legs 126 and 128 of the stationary conductors 60 and 62. Thus, assuming a direction of current flow indicated by the arrows 38, 40 and 42 in FIG. 1, the direction of flow of electrical current in the movable conductor 82 is from left to right (as viewed in FIG. 2), that is, from the movable main circuit contact 88 to the movable main circuit contact 90. However, the direction of current flow in the legs 126 and 128 of the stationary conductors 60 and 62 is from right to left (as viewed in FIG. 2).

The current in the leg 126 of the stationary conductor 60 flows leftward (as viewed in FIG. 2). Thus, the current flows from a bend 130 in the stationary conductor 60 toward the stationary main circuit contact 52. The direction of flow of electrical current in the leg 128 of the stationary conductor 62 is also toward the left (as viewed in FIG. 2). Thus, the current flows from the stationary main circuit contact 54 toward a bend 132 in the stationary conductor 62.

Since the direction of flow of current in the movable conductor 82 is opposite to the direction of flow of current in the legs 126 and 128 of the stationary conductors 60 and 62, the magnetic field emanating from the current flowing through the movable conductor 82 opposes the magnetic fields emanating from the current flowing through the legs 126 and 128 of the stationary conductors 60 and 62. The opposition between the magnetic fields emanating from the current in the movable conductor 82 and the legs 126 and 128 of the stationary conductors 60 and 62 urges the movable conductor 82 away from the stationary conductors 60 and 62. However, during normal current flows to the motor 12, magnetic repulsion forces between the magnetic fields resulting from the opposite directions of current flow through the movable conductor 82 and stationary conductors 60 and 62, are insufficient to overcome the biasing effect of the spiral coil spring 84. Therefore, the movable conductor 82 remains in the closed or initial position shown in FIG. 2 during normal operation of the motor 12.

During operation of the motor 12, the motor may seriously malfunction in such a manner as to cause an electrical short circuit across the motor 12. This results in initiation of an excessive flow of current to the motor. Upon initiation of either high or low levels of excessive current flow to the motor 12, the current limiting switch assembly 30 is quickly operated from the initial condition of FIG. 2 toward the fully open condition of FIG. 3 to interrupt the flow of current through the motor starter 20. This protects the components of the motor starter 20 against the effect of excessive current flows.

Rapid operation of the current limiting switch assembly 30 to the open condition is promoted by magnetic repulsion force and by interaction between the coil 72 and plunger 110. Upon initiation of low levels of excessive current flow through the current limiting switch assembly 30, for example less than 2,000 amps, the flow of current through the coil 72 increases and causes the plunger 110 to move the conductor 82 and complete the bypass circuit 46. This may occur before magnetic repulsion forces resulting from the opposite directions of current flow have become strong enough to move the conductor 82 when the level of excessive current flow is low, for example less than 2,000 amps.

Upon initiation of high levels of excessive current flow through the current limiting switch assembly 30, for example more than 2,000 amps, the flow of current results in magnetic repulsion forces which move the conductor 82 and complete the bypass circuit 46. This may occur before the current flow through the coil 72 causes the plunger 110 to move the conductor 82, when the level of excessive current flow is high, for example more than 2,000 amps. When the level of excessive current flow is high, movement of the plunger 110 may be effective to block return movement of conductor 82 toward the stationary main circuit contacts 52 and 54 after the magnetic repulsion forces have moved the conductor 82 to the fully open position and current flow through the stationary conductor 60 has decreased.

When the current limiting switch assembly 30 is in the fully open condition of FIG. 3, the movable main circuit contacts 88 and 90 on the movable conductor 82 are spaced from the stationary main circuit contacts 52 and 54. This opens the main circuit 14 to interrupt the flow of current through the motor starter 20. At this time, the movable bypass circuit contact 92 is disposed in engagement with the stationary bypass circuit contact 56. An end portion of the movable conductor 82 opposite from the movable bypass circuit contact 92 is disposed in abutting engagement with a stop 140 which is formed as part of the housing 50.

The movable conductor 82 is moved from the initial condition of FIG. 2 to the fully open condition of FIG. 3 under the effect of force transmitted to the movable conductor 82 from the plunger 110, or repulsion between magnetic fields emanating from oppositely flowing electrical current in the movable conductor 82 and legs 126 and 128 of the stationary conductors 60 and 62, or by both of these effects. Upon initiation of the flow of excessive current through the main circuit 14 to the motor 12, the flow of current through the coil 72 increases.

Increasing the flow of current to the coil 72 increases the strength of the magnetic field emanating from the coil. This results in the armature 112 being pulled into the coil 72 against the influence of the biasing spring 120. The armature 112 moves from the position shown in FIG. 2 toward the position shown in FIG. 3. As this occurs, the head end 114 of the plunger 110 applies force against the movable contactor 82 to initially separate the movable main circuit contacts 88 and 90 from the stationary main circuit contacts 52 and 54.

The increased current flow which occurs upon initiation of an excessive flow of current to the motor 12 increases the strength of the magnetic fields emanating from the flow of current in the legs 126 and 128 of the stationary contacts 60 and 62 and the flow of current in the movable conductor 82. Since the direction of flow of current in the movable conductor 82 is opposite to the direction of flow of the current in the legs 126 and 128 of the stationary conductors 60 and 62, magnetic repulsion between the movable conductor 82 and stationary conductors 60 and 62 assist the plunger 110 in moving the movable conductor 82 from the initial or closed condition of FIG. 2 toward the fully open condition of FIG. 3. This results in rapid operation of the current limiting switch assembly 30 to immediately open the main circuit 14. As this occurs, the excessive current is conducted around the motor starter 20 through the bypass circuit 46.

The current limiting switch assembly 30 is operated under the combined effects of the interaction between the coil 72 and plunger 110 and magnetic repulsion forces between current flowing in opposite directions. However, in case of low excessive current flow, the interaction between the coil 72 and plunger 110 may move the conductor 82 before the magnetic repulsion forces have obtained sufficient strength to move the conductor 82. Therefore, when there is low excessive current flow, the current limiting switch assembly 30 is operated faster than would be the case if only magnetic repulsion forces were relied upon to operate the current limiting switch assembly. In the case of high excessive current flow, the magnetic repulsion forces may move the conductor 82 before the interaction between the coil 72 and plunger 110 is effective to move the conductor. Therefore, when there is high excessive current flow, the current limiting switch assembly 30 is operated faster than would be the case if only the interaction between the coil 72 and plunger 110 was relied upon to operate the current limiting switch assembly.

If desired, the current limiting switch assembly 30 could have a construction which is different from the illustrated construction. For example, the right end (as viewed in FIG. 2) of the movable conductor 82 could be pivotally connected with the stationary conductor 62. Alternatively, the movable conductor 82 could be moved along a linear path between the initial condition and the fully open condition.

Operation

Figure 4:
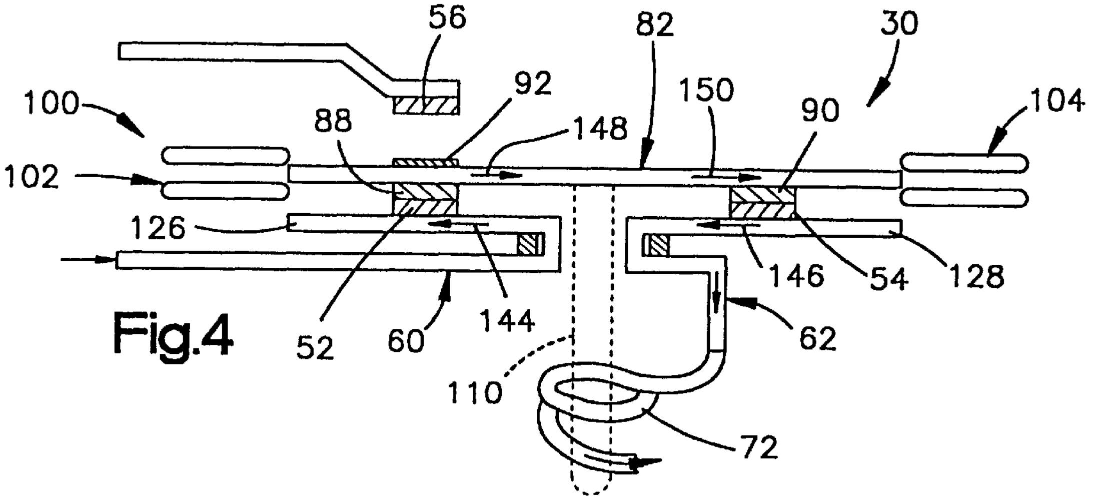
FIG. 4 is a highly schematicized illustration depicting contacts in the current limiting switch assembly of FIG. 2 when the current limiting switch assembly is in the unactuated condition.
Figure 6:
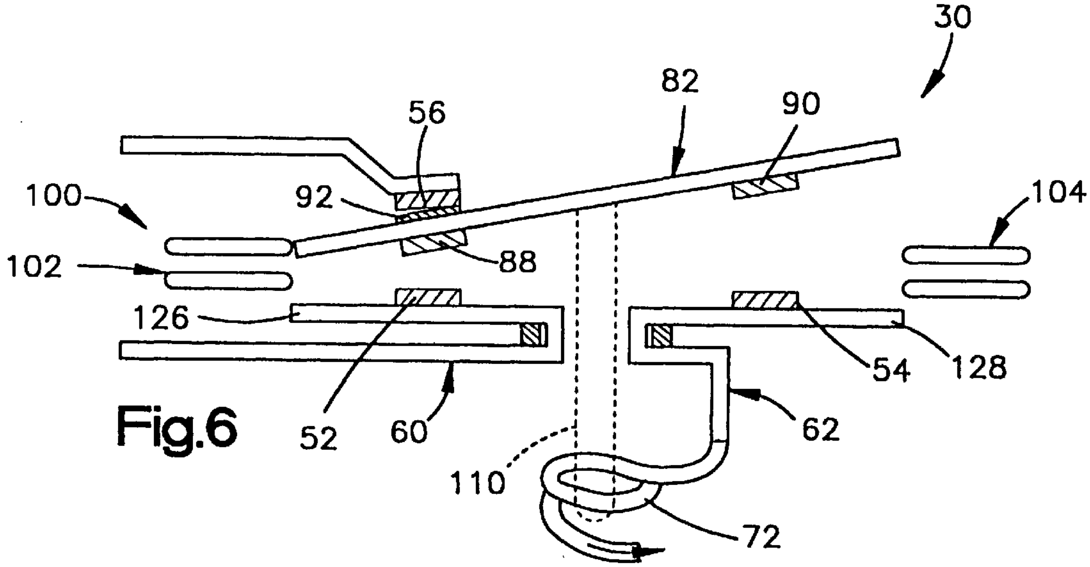
FIG. 6 is a schematic illustration, generally similar to FIGS. 4 and 5, depicting the contacts in the current limiting switch assembly when the current limiting switch assembly is in the fully open condition.

The manner in which the current limiting switch assembly 30 operates from the initial or closed condition of FIG. 2 through one of a plurality of actuated conditions to the fully open condition of FIG. 3 is illustrated schematically in FIGS. 4, 5 and 6. Although alternating current is conducted from the power lines 34 and 36 through the current limiting switch assembly 30, the direction of flow of the electrical current has been assumed in FIGS. 4–6 to be in accordance with the arrows 38, 40 and 42 in FIG. 1. Of course, the direction of current flow at any instant may be opposite to the directions indicated by the arrows 38, 40 and 42 in FIG. 1.

During normal operation of the motor 12, the current limiting switch assembly 30 is in the initial condition illustrated schematically in FIG. 4. At this time, the electrical current flow in the main circuit 14 is conducted through the stationary conductor 60 to the movable conductor 82. The current then flows from the movable conductor 82 through the stationary conductor 62 to the coil 72.

The direction of current flow in the leg 126 of the stationary conductor 60 and in the leg 128 of the stationary conductor 62 is toward the left (as viewed in FIG. 4). The assumed direction of current flow in the legs 126 and 128 of the stationary conductors 60 and 62 is indicated by arrows 144 and 146 in FIG. 4. The direction of flow of current in the movable conductor 82 is toward the right, as indicated schematically by arrows 148 and 150 in FIG. 4. As was previously mentioned, during normal operation of the motor 12, the rate of flow of current through the main circuit 14 is insufficient to cause actuation of the current limiting switch assembly 30 from the illustrated initial condition of FIG. 4.

Upon malfunctioning of the motor 12 and the initiation of an excessive flow of electrical current in the main circuit 14, the flow of current through the coil 72 increases. The increased flow of current through the coil 72 immediately causes the armature 112 to quickly move inward from the position shown in FIG. 2 toward the position shown in FIG. 3. As this occurs, the movable conductor 82 is moved from the initial condition shown in FIG. 4 toward the actuated condition shown in FIG. 5.

The increased electrical flow of current which occurs upon initiation of a flow of excessive current to the motor 12, increases the strength of the magnetic fields emanating from the legs 126 and 128 of the stationary conductors 60 and 62 and the movable conductor 82. The magnetic fields emanating from the legs 126 and 128 of the stationary conductors 60 and 62 are opposite from the magnetic field emanating from the movable conductor 82. The opposition between the magnetic fields emanating from the legs 126 and 128 of the stationary conductors 60 and 62 and the magnetic field emanating from the movable conductor 82 urges the movable conductor away from the closed or initial condition of FIG. 4 toward the actuated condition of FIG. 5.

From the foregoing, it is apparent that the movable conductor 82 is moved away from the initial condition (FIG. 4) to an actuated condition (FIG. 5) under the combined influence of movement of the plunger 110 by the coil 72 and repulsion between the magnetic field emanating from the electrical current in the movable conductor and magnetic fields emanating from the stationary conductors 60 and 62. At low excessive current flow, the plunger 110 and coil 72 may operate first to move the movable conductor, and at high excessive current flow repulsion between the magnetic field emanating from the electrical currents in the movable and stationary conductors may operate to move the movable conductor.

As the movable conductor 82 begins to move away from the legs 126 and 128 of the stationary conductors 60 and 62, arcing occurs. Although there may initially be some arcing directly between the stationary main circuit contacts 52 and 54 and the movable main circuit contacts 88 and 90, the majority of the arcing will be through the splitter plates 100. Thus, as the movable conductor 82 moves away from the legs 126 and 128 of the stationary conductors 60 and 62, an electrical arc is conducted from the leg 126 of the stationary conductor 60 through the left series 102 of splitter plates 100 to the left (as viewed in FIG. 5) end portion of the movable conductor 82. At the same time, arcing is established between the right (as viewed in FIG. 5) end portion of the movable conductor 82 and the right series 104 of splitter plates.

The combined influence of the coil 72 on the plunger 110 and the opposition between the magnetic fields in the legs 126 and 128 of the stationary conductors 60 and 62 and the movable conductor 82 results in the movable bypass circuit contact 92 engaging the stationary bypass circuit contact 56 (FIG. 5). Once this has occurred, current flow is established in the bypass circuit 46, in the manner indicated schematically by the arrow 156 in FIGS. 1 and 5.

Upon engagement of the movable bypass circuit contact 92 with the stationary bypass circuit contact 56, there is no longer a significant electrical potential differential between the leg 126 of the stationary conductor 60 and the movable conductor 62. This results in the arc through the left series 102 of splitter plates being quickly extinguished with a rapid interruption of the flow of current through the main circuit 14 and the motor starter 20. As this occurs, the flow of current is established around the motor starter 20 in the bypass circuit 46.

The flow of current in the bypass current 46 is conducted from the bypass circuit lead 80 (FIGS. 2 and 3) through the stationary bypass contact 56 to the movable bypass contact 92 (FIG. 5). The bypass current then flows from the movable conductor 82 through the arcing between the movable conductor and the right series 104 of splitter plates. The bypass current flows through arcing between the splitter plates in the right series 104 of splitter plates to the leg 128 of the stationary conductor 62. This bypass current is conducted through the coil 72 and the motor 12.

Since the arcing at the left series 102 of splitter plates is quickly extinguished, the flow of current in the main circuit 14 is quickly interrupted. Therefore, the motor starter 20 is only instantaneously exposed to the excessive current flow conducted to the motor 12. The prolonged arcing which occurs at the right series of splitter plates 104 is part of the bypass circuit current which is conducted around the motor starter 20.

As the movable conductor 82 continues to move under the influence of force transmitted through the plunger 110 and the opposition between the magnetic fields emanating from the legs 126 and 128 of the stationary conductors 60 and 62 and the magnetic field emanating from the movable conductor 82, the movable conductor is moved toward the fully open condition shown in FIG. 6. As this occurs, the movable conductor 82 pivots about a location where the movable bypass circuit contact 92 engages the stationary bypass circuit contact 56. This results in counterclockwise (as viewed in FIGS. 5 and 6) pivoting movement of the movable conductor 82.

As the movable conductor pivots, the right end portion of the movable conductor 82 moves away from the right series 104 of splitter plates 100. This results in the arc between the right end portion of the movable conductor 82 and the right series 104 of splitter plates 100 being extinguished, in the manner illustrated schematically in FIG. 6. Pivoting movement of the movable conductor at the fully open condition of FIGS. 3 and 6 is interrupted by engagement of the movable conductor with the stop 140 (FIGS. 2 and 3).

By the time the movable conductor 82 has moved to the fully open condition shown in FIG. 6, the excessive flow of current through the bypass circuit 46 will have caused the motor circuit protector 18 to open. Upon opening of the motor circuit protector 18, the bypass circuit 46 is opened. The motor circuit protector 18 is magnetically tripped and latched in the open position. This results in both the main circuit 14 and the bypass circuit 46 being open.

As the current limiting switch assembly 30 is operated to the fully open condition of FIG. 6 and the motor circuit protector 18 opens, the flow of current through the coil 72 and through the movable conductor 82 is interrupted. When this occurs, the biasing spring 120 (FIGS. 2 and 3) moves the plunger 110 back toward the initial position of FIG. 2. At the same time, the spiral spring 84 moves the movable conductor 82 back toward the initial condition of FIG. 2.

It should be understood that the movable conductor 82 may not reach the fully open condition of FIG. 6 before the motor circuit protector 18 opens. Thus, the movable conductor 82 may have pivoted only part way from the actuated condition shown in FIG. 5 toward the fully open condition of FIG. 6 when the motor circuit protector 18 opens.

Upon movement of the movable conductor 82 back to the initial condition shown in FIG. 2, the current limiting switch assembly 30 is again closed to establish a main circuit current flow path through the current limiting switch assembly. However, by the time this occurs, the motor circuit protector 18 has latched in the open position so that the main circuit 14 is interrupted. Therefore, excessive current flow can not be reestablished to the electric motor 12. Even though the electric motor 12 may have been irreparably damaged by the excessive flow of electrical current through the motor, the motor starter 20 will remain in an undamaged condition due to the rapid interruption of the main circuit 14 by the current limiting switch assembly 30.

Conclusion

In view of the foregoing description, it is apparent that the present invention provides a new and improved apparatus 10 and method for use in controlling an electric motor 12. The apparatus 10 includes a main circuit 14 which conducts electrical current to the electric motor 12 during normal operation of the electric motor. The main circuit 14 includes a motor starter 20 and a current limiting switch assembly 30. A bypass circuit 46 is provided to conduct electrical current around the motor starter 20 upon initiation of a flow of excessive electrical current to the electric motor 12.

When the current limiting switch assembly is in an initial condition, the bypass circuit 46 is open and electrical current is conducted through the motor starter and current limiting switch assembly 30 to the electric motor 12. When the current limiting switch assembly 30 is in an actuated condition, the current limiting switch assembly 30 is effective to open the main circuit 14 to interrupt the flow of electrical current through the motor starter 20. At this time, the current limiting switch assembly 30 closes the bypass circuit 46 to conduct the excess flow of electrical current around the motor starter 20.

The current limiting switch assembly 30 may include a movable conductor 82 on which contacts 88, 90 and 92 are disposed. The movable conductor 82 is moved relative to stationary contacts 52, 54 and 56 by the effect of magnetic field repulsion, or movement of an armature 112 by a coil 72, or by both of these effects. This minimizes the response time required for the current limiting switch assembly 30 to operate from the initial condition to an actuated condition to protect the motor starter 20 in the event of initiation of excessive current flow to the motor 12.

Having described the invention, the following is claimed:

1. An apparatus for use in controlling an electric motor, said apparatus comprising main circuit means for conducting electrical current to the electric motor during normal operation of the electric motor, said main circuit means including a motor starter and a current limiting switch assembly which are connected in series and through which electrical current is conducted during normal operation of the electric motor, and bypass circuit means for conducting electrical current around said motor starter to said current limiting switch assembly upon initiation of a flow of excessive electrical current to the electric motor to protect said motor starter against excessive current flow, said current limiting switch assembly including a movable conductor which is movable between a first position and a second position, said movable conductor being effective to open said bypass circuit means and form a portion of said main circuit means to conduct electrical current which energizes the electric motor during normal operation of the electric motor when said movable conductor is in the first position, said movable conductor being effective to open said main circuit means and form a portion of said bypass circuit means to conduct electrical current which flows to the electric motor when said movable conductor is in the second position, said current limiting switch assembly including means for moving said movable conductor from the first position to the second position upon initiation of a flow of excessive electrical current to the electric motor.

2. An apparatus as set forth in claim 1 wherein said current limiting switch assembly includes first and second stationary contact areas which form a portion of said main circuit means and a third stationary contact area which forms a portion of said bypass circuit means, said movable conductor having first and second movable contact areas which are disposed in engagement with said first and second stationary contact areas when said movable conductor is in the first position to enable said movable conductor to conduct electrical current between said first and second stationary contact areas when said movable conductor is in the first position, said movable conductor having a third movable contact area which is disposed in engagement with said third stationary contact area when said movable conductor is in the second position, said third movable contact area on said movable conductor being spaced from said third stationary contact area to open said bypass circuit means when said movable conductor is in the first position, said first and second movable contact areas on said movable conductor being spaced from said first and second stationary contact areas to open said main circuit means when said movable conductor is in said second position.

3. An apparatus as set forth in claim 1 wherein said movable conductor conducts electrical current in a first direction when said movable conductor is in the first position, said means for moving said movable conductor from the first position to the second position includes a stationary conductor which conducts electrical current in a second direction opposite to the first direction and is disposed adjacent to said movable conductor to enable a magnetic field emanating from said stationary conductor to oppose a magnetic field emanating from said movable conductor and urge said movable conductor toward the second position.

4. An apparatus as set forth in claim 1 wherein said means for moving said movable conductor from the first position to the second position includes a coil and a plunger which extends through said coil and is movable relative to said coil to move said movable conductor toward the second position, said coil being connected in series with said motor starter and the electric motor to enable said coil to conduct electrical current which energizes the electric motor during normal operation of the electric motor with said movable conductor in the first position and to enable said coil to conduct electrical current which flows to the electric motor when said movable conductor is in the second position.

5. An apparatus as set forth in claim 4 further including spring means for urging said plunger toward an initial position relative to said coil, said plunger being movable from the initial position against the influence of said spring means under the influence of a magnetic field emanating from said coil upon initiation of a flow of excessive electrical current through said coil to the electric motor.

6. An apparatus for use in controlling an electric motor, said apparatus comprising main circuit means for conducting electrical current to the electric motor during normal operation of the electric motor, said main circuit means including a motor starter and a current limiting switch assembly, and bypass circuit means for conducting electrical current around said motor starter upon initiation of a flow of excessive electrical current to the electric motor to protect said motor starter against excessive electrical current flow, said current limiting switch assembly being operable between a first condition and a second condition, said current limiting switch assembly being effective to open said bypass circuit means and to conduct electrical current which energizes the electric motor during normal operation of the electric motor with said current limiting switch assembly in the first condition, said current limiting switch assembly being effective to open said main circuit means and interrupt current flow through said motor starter and to form a portion of said bypass circuit means and conduct electrical current which flows through said bypass circuit means to the electric motor during flow of excessive electrical current to the electric motor.

7. An apparatus as set forth in claim 6 wherein said current limiting switch assembly includes a first stationary contact which forms a portion of said main circuit means and is connected with a source of electrical potential through said motor starter and a second stationary contact which forms a portion of said bypass circuit means and is connected with the source of electrical potential through said bypass circuit means, said current limiting switch assembly including a movable conductor having a first contact area which is in engagement with said first stationary contact when said current limiting switch assembly is in the first condition to enable said movable conductor to conduct electrical current which energizes the electric motor during normal operation of the electric motor, said movable conductor having a second contact area which is in engagement with said second stationary contact when said current limiting switch assembly is in the second condition to enable said movable conductor to conduct electrical current which flows to the electric motor during flow of excessive electrical current to the electric motor, said first contact area on said movable conductor being spaced from said first stationary contact to open said main circuit means when said current limiting switch assembly is in the second condition.

8. An apparatus as set forth in claim 7 wherein said current limiting switch assembly includes a coil and a plunger which is movable relative to said coil to move said movable conductor away from a first position in which said first contact area on said movable conductor is in engagement with said first stationary contact toward a second position in which said second contact area on said movable conductor is in engagement with said second stationary contact.

9. An apparatus as set forth in claim 8 wherein said movable conductor conducts electrical current in a first direction when said movable conductor is in the first position, said current limiting switch assembly includes a stationary conductor which conducts electrical current in a second direction opposite to the first direction and is disposed adjacent to said movable conductor to enable a magnetic field emanating from the stationary conductor to oppose a magnetic field emanating from said movable conductor and urge said movable conductor toward the second position.

10. An apparatus as set forth in claim 6 wherein said current limiting switch assembly includes first switch contacts which are disposed in engagement with each other when said current limiting switch assembly is in the first condition, second switch contacts which are disposed in engagement with each other when said current limiting switch assembly is in the second condition, a coil, a plunger which extends through said coil and is movable relative to said coil to effect operation of said current limiting switch assembly from the first condition toward the second condition, said coil being effective to conduct electrical current flowing from said first switch contacts to the electric motor when said current limiting switch assembly is in the first condition and being effective to conduct electrical current flowing from said second switch contacts to the electric motor when said current limiting switch assembly is in the second condition.

11. A method of controlling an electric motor, said method comprising the steps of conducting a flow of electric current to an electric motor along a main current flow path which extends through a motor starter and a current limiting switch assembly during normal operation of the electric motor, responding to an excessive flow of electrical current to the electric motor, and interrupting the flow of electrical current through the motor starter and conducting electrical current to the electric motor along a bypass current flow path which extends around the motor starter and through the current limiting switch assembly in response to initiation of the excessive flow of electrical current to the motor.

12. A method as set forth in claim 11 wherein said step of interrupting the flow of electrical current through the motor starter and conducting electrical current to the electric motor along a bypass current flow path which extends around the motor starter and through the current limiting switch assembly includes operating the current limiting switch assembly from a first condition to a second condition under the influence of electric current conducted along the main current flow path.

13. A method as set forth in claim 11 wherein said step of conducting a flow of electric current to an electric motor along a main current flow path which extends through the motor starter and current limiting switch assembly includes conducting electric current through a first stationary contact to a first contact area on a movable conductor in the current limiting switch assembly, conducting electric current through a second contact area on the movable conductor to a second stationary contact in the current limiting switch assembly, said step of interrupting the flow of electrical current through the motor starter and conducting electrical current to the electric motor along a bypass current flow path which extends around the motor starter and through the current limiting switch assembly includes moving the first contact area on the movable conductor away from the first stationary contact and moving a third contact area on the movable conductor into engagement with a third stationary contact.

14. A method as set forth in claim 13 wherein said step of interrupting the flow of electrical current through the motor starter and conducting electrical current to the electric motor along a bypass current flow path which extends around the motor starter and through the current limiting switch assembly further includes moving the second contact area on the movable conductor away from the second stationary contact.

15. A method as set forth in claim 14 wherein said step of moving the second contact area on the movable conductor away from the second stationary contact includes pivoting the movable conductor about an area of engagement of the third contact area on the movable conductor with the third stationary contact.

16. An apparatus for use in controlling an electric motor, said apparatus comprising main circuit means for conducting electrical current to the electric motor during normal operation of the electric motor, said main circuit means including a motor starter and a current limiting switch assembly, and bypass circuit means for conducting electrical current around said motor starter upon initiation of a flow of excessive electrical current to the electric motor to protect said motor starter against excessive electrical current flow, said current limiting switch assembly includes first and second stationary contacts which form part of said main circuit means, a movable conductor which has a first contact area which is engageable with said first stationary contact and a second contact area which is engageable with said second stationary contact to enable said movable conductor to conduct electrical current which flows to the motor during normal operation of the motor, a third stationary contact which forms part of said bypass circuit means, said movable conductor having a third contact area which is engageable with said third stationary contact to enable said movable conductor to conduct electrical current which flows to the motor during excessive electrical current flow.

17. An apparatus as set forth in claim 16 wherein said current limiting switch assembly includes a coil through which electrical current is conducted during normal operation of the motor and through which electrical current is conducted during a flow of excessive electrical current to the motor and a plunger which extends through said coil, said plunger being movable relative to said coil to effect movement of said movable conductor away from said first and second stationary contacts upon initiation of excessive electrical current flow to the motor.

18. An apparatus as set forth in claim 16 wherein electrical current flows in a first direction through said movable conductor, said current limiting switch assembly including a stationary conductor which is disposed adjacent to said movable conductor when said first and second contact areas on said movable conductor are disposed in engagement with said first and second stationary contacts and through which electrical current flows in a second direction opposite to said first direction to enable magnetic fields emanating from said movable conductor and said stationary conductor to interact in such a manner as to urge said movable conductor away from said first and second stationary contacts.

19. An apparatus as set forth in claim 16 wherein said movable conductor is pivotal about an area of engagement of said third contact area with said third stationary contact to move said second contact area on said movable conductor away from said second stationary contact.

20. An apparatus for use in controlling an electric motor, said apparatus comprising main circuit means for conducting electrical current to the electric motor during normal operation of the electric motor, said main circuit means including a motor starter and a current limiting switch assembly, and bypass circuit means for conducting electrical current around said motor starter upon initiation of a flow of excessive electrical current to the electric motor to protect said motor starter against excessive electrical current flow, said current limiting switch assembly includes a movable conductor through which current flows in a first direction, said movable conductor being movable between an initial position and an actuated position, a stationary conductor through which current flows in a second direction opposite to said first direction to enable magnetic fields emanating from said movable conductor and said stationary conductor to interact in such a manner as to urge said movable conductor away from the initial position toward the actuated position, a coil through which electrical current is conducted when said movable conductor is in the initial position and the actuated position, and a plunger which extends through said coil, said plunger being movable relative to said coil to urge said movable conductor away from the initial position toward the actuated position.

21. An apparatus as set forth in claim 20 wherein said movable conductor forms a portion of said main circuit means through which current is conducted to the electric motor when said movable conductor is in the initial position, said movable conductor forming a portion of said bypass circuit means through which electrical current is conducted around said motor starter when said movable conductor is in the actuated position.

22. An apparatus as set forth in claim 20 wherein said current limiting switch assembly includes a first stationary contact which forms part of said main circuit means and a second stationary contact which forms part of said bypass circuit means, said movable conductor having a first contact area which is disposed in engagement with said first stationary contact when said movable conductor is in the initial position, said movable conductor having a second contact area which is disposed in engagement with said second stationary contact when said movable conductor is in the actuated position.

23. An apparatus as set forth in claim 22 wherein said movable conductor is pivotal about an area of engagement of said second contact area on said movable conductor with said second stationary contact when said movable conductor is in the actuated position.

* * * * *